(12) United States Patent
Rose et al.

(10) Patent No.: US 8,376,858 B2
(45) Date of Patent: Feb. 19, 2013

(54) SYSTEM AND METHOD FOR COMMUNICATING GAME INFORMATION BETWEEN A PORTABLE GAMING DEVICE AND A GAME CONTROLLER

(75) Inventors: Robert Rose, Bend, OR (US); Christopher Reese, Bend, OR (US); John Garvin, Bend, OR (US); Joseph C. Adzima, Bend, OR (US)

(73) Assignee: Sony Computer Entertainment America LLC, Foster City, CA (US)

( * ) Notice: Subject to any disclaimer, the term of this patent is extended or adjusted under 35 U.S.C. 154(b) by 455 days.

(21) Appl. No.: 12/380,009

(22) Filed: Feb. 20, 2009
(Under 37 CFR 1.47)

(65) Prior Publication Data
US 2010/0216552 A1 Aug. 26, 2010

(51) Int. Cl.
*A63F 9/24* (2006.01)
(52) U.S. Cl. ............ 463/42; 463/30; 463/37; 463/38; 463/39; 463/40
(58) Field of Classification Search ............ 463/30, 463/37, 42
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger et al. | |
| 5,128,671 A | 7/1992 | Thomas, Jr. | |
| 5,528,265 A | 6/1996 | Harrison | |
| 6,157,368 A | 12/2000 | Fager | |
| 6,375,572 B1 | 4/2002 | Masuyama et al. | |
| 6,402,625 B2 * | 6/2002 | Armstrong | 472/59 |
| 6,921,336 B1 * | 7/2005 | Best | 463/32 |
| 2002/0085097 A1 | 7/2002 | Colmenarez et al. | |
| 2004/0212589 A1 | 10/2004 | Hall et al. | |
| 2005/0052430 A1 * | 3/2005 | Shahoian et al. | 345/173 |
| 2005/0113167 A1 * | 5/2005 | Buchner et al. | 463/30 |
| 2005/0145100 A1 * | 7/2005 | Ramstein | 84/645 |
| 2007/0066394 A1 * | 3/2007 | Ikeda et al. | 463/37 |

FOREIGN PATENT DOCUMENTS

WO 2007/035314 A2 3/2007
WO WO 2007035314 A2 * 3/2007

OTHER PUBLICATIONS

NagCortgoft, ESPN NBA Basketball: Distract opponent Playstation 2; website: http://www.chaptercheats.com/cheat/playstation2/11156/ESPN-NBA-Basketball/code/6829/ Published Mar. 5, 2007; pp. 1-2.*
Jespomo, ESPN NBA Basketball Cheats; webiste: http://www.neoseeker.com/Games/cheats/Xbox/nba_2k4.html Published: Apr. 27, 2006; pp. 1-5.*
PS2 Playstation2 Model SCPH-79001CB; Instruction Manual; Published 2007 Sony Computer Entertainment Inc; pp. 1-53 and 168.*
International Search Report, PCT/US2009/063198, dated Dec. 29, 2009.

(Continued)

*Primary Examiner* — N Drew Richards
*Assistant Examiner* — John P Dulka
(74) *Attorney, Agent, or Firm* — Lerner, David, Littenberg, Krumholz & Mentlik, LLP

(57) ABSTRACT

A method and system for transmitting game related information from a hand-held gaming device through a game console to a game controller and vice versa. In one aspect, the game related information comprises command information that causes the game controller to respond either by vibrating, rumbling or other action associated with a game being played. In another aspect, the game related information may include controller signals that cause an action at the hand-held device.

19 Claims, 3 Drawing Sheets

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

* cited by examiner

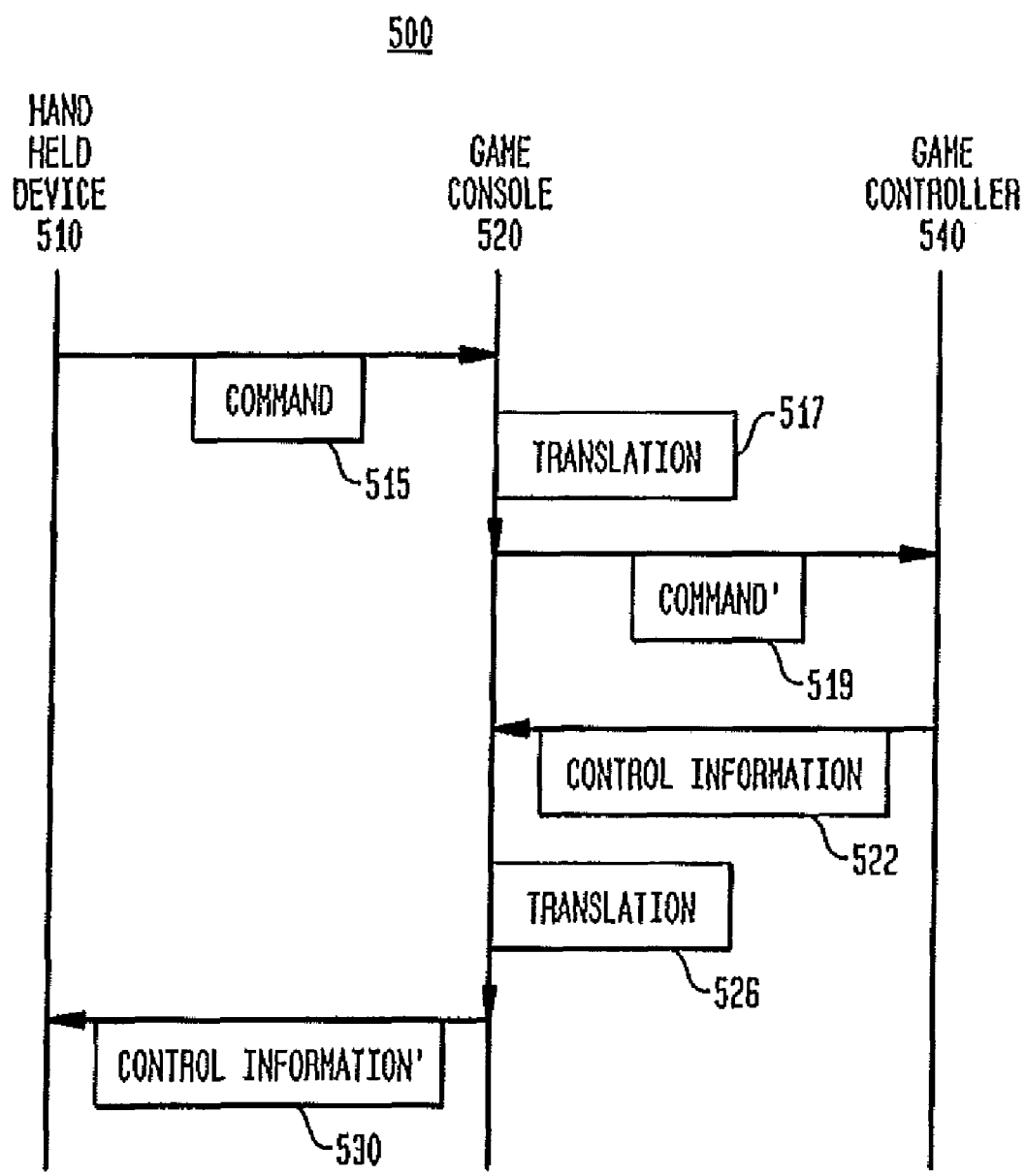

SYSTEM AND METHOD FOR COMMUNICATING GAME INFORMATION BETWEEN A PORTABLE GAMING DEVICE AND A GAME CONTROLLER

BACKGROUND OF THE INVENTION

The present invention generally relates to video game entertainment systems and methods, apparatus and systems that enhance the capabilities of hand-held game devices.

Modern day video game entertainment systems generally include two types of apparatus: (1) hand-held game consoles or devices and (2) video game consoles. Generally, hand-held game devices are portable and include a central processing unit that uses an operating system to manage and run various gaming applications. Although such devices are small enough to be carried in a user's coat pocket, their processing power is usually significant enough to allow them to support relatively complex games and display such games at a relatively high resolution. SONY's PLAYSTATION PORTABLE (PSP) is an example of one such hand-held game device. The terms "PLAYSTATION," "PSP," "PLAYSTATION PORTABLE," and "SONY" are trademarks or registered trademarks of Sony Computer Entertainment Inc. or Sony Corporation. It includes a large viewing screen, supports various multi-media applications and is connectable to Sony's PlayStation video game consoles. Given its processing power and many features, the PSP is regarded by many as the standard bearer among hand-held game devices.

Like the PSP, SONY's PLAYSTATION game consoles are also considered by many to be the standard bearer within the gaming industry. For example, these products employ cell processor technology, include large storage capacity (e.g., more than 20G) and come equipped to support various multimedia applications. Accordingly, these products are equipped to run complex gaming software at high speed and with high image resolution.

In order to meet the requirement that hand-held game devices be portable, control buttons used to operate such devices are usually provided on the face of the device. These control buttons typically do not include all the capabilities of stand alone game controllers typically used to operate a video game console.

While the additional capability of a stand alone game controller is not usually important for all games, some games are designed to take advantage of the additional functionality on such controllers. For example, some games, e.g., a racing game, provide feedback in the form of haptic information to a game controller to enhance the gaming experience to the user during play. Hand-held game devices, however, typically do not include such functionality. On the other hand, it may be desirable and of utility to develop games for hand-held devices that output haptic information.

BRIEF SUMMARY OF THE INVENTION

In one aspect, the present invention is a system comprising a game console and a game controller coupled to the game console through a first interface and capable of generating and processing controller command information. The system may also include a local hand-held game device coupled to the game console through a second interface and operable to transmit and receive controller command information through the game console to and from the game controller.

Further in accordance with this aspect of the present invention, the controller command information preferably includes haptic control information. In addition, the haptic control information may comprise information associated with forces, vibration or motion.

Further still in accordance with this aspect of the present invention, the controller command information may comprise command information causing the game console to initiate a predetermined action. Preferably, the predetermined action includes capturing an image using a camera coupled to the game console. Further still in accordance with this aspect of the present invention, the game console desirably transmits the captured image to the local hand-held game device through the second interface.

In accordance with this aspect of the present invention, the first and second interfaces comprise interfaces selected from the group consisting of USB (universal serial bus), WiFi and Bluetooth connection interfaces. In addition, the game console preferably includes a third interface for communicating with a remotely located hand-held game device.

Further in accordance with this aspect of the present invention, the system further includes the capability to communicate gaming information between the local and remote hand-held game devices through the game console.

Further still in accordance with this aspect of the present invention, the game console includes a data processor that processes gaming information for the hand-held device and wherein the gaming information comprises rendering information associated with on-screen objects for the hand-held device and the rendering information causes a change in location of an object on a screen associated with the hand-held game device.

In another aspect, the present invention is a system for communicating game information, comprising: a game console capable of processing haptic information; a game controller coupled to the game console through a first interface and capable of processing haptic information received from the game console; and a hand-held game device coupled to the game console through a second interface and capable of transmitting haptic information to the game console.

In accordance with this aspect of the present invention, the hand-held game device communicates with the game console using an application layer protocol that translates haptic information generated by the hand-held device into control information compatible with the game controller.

Further in accordance with this aspect of the present invention, the hand-held device is preferably a Sony PlayStation Portable and the game console is a Sony PlayStation.

The present invention in another aspect comprises a method for communicating information in a gaming system, comprising: generating a message including haptic control information at a hand held game device; transmitting the message to a game console; and transmitting, by the game console, the message to a game controller that is responsive to haptic control information. In addition, the invention in this aspect may further comprise the step of translating, at the game console, the message from a first format generated by the hand held game device into a second format that is compatible with the game controller.

BRIEF DESCRIPTION OF THE DRAWINGS

FIG. 5 illustrates the steps of a method in accordance with an aspect of the present invention.

DETAILED DESCRIPTION

Figure 1:
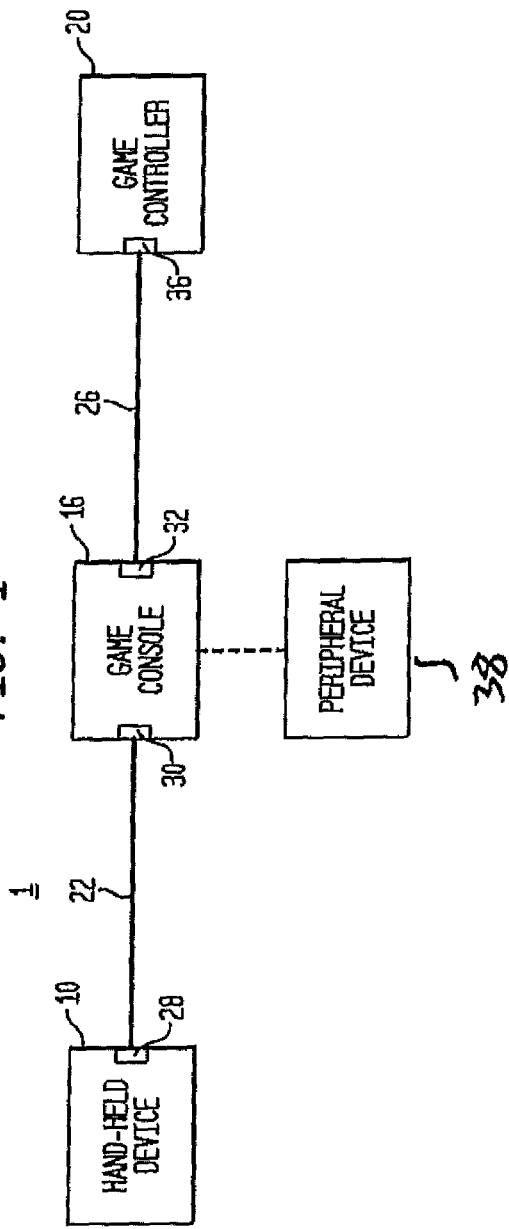
FIG. 1 illustrates a system in accordance with an aspect of the present invention.

FIG. 1 illustrates a system 1 in accordance with an aspect of the present invention. The system 1 includes a hand-held game device 10, a game console 16 and game controller 20. The device 10 and console 16 are connected via a first connection 22 and the console 16 is connected to the game controller 20 via a second connection 26. As shown, the connection 22 is made between interface 28 on the hand-held device 10 and a first interface 30 on the game console 16. Connection 26 is made between a second interface 32 on the game console 16 and an interface 36 on the game controller 20. The game console 16 may also be optionally connected to a peripheral device 38 or, as is explained in further detail below, the peripheral device 38 may be incorporated into the game console. In the system 1, commands generated at hand-held device 10 are processed by game console 16 and transmitted to game controller 20 using connections 22 and 26. In a preferred embodiment, such commands may include haptic information that causes the game controller 20 to communicate a sense of touch to a user, such as rumbling or vibrations. Conversely, signals generated by game controller 20 are processed by game console 16 and transmitted to hand-held device 10.

Figure 2:
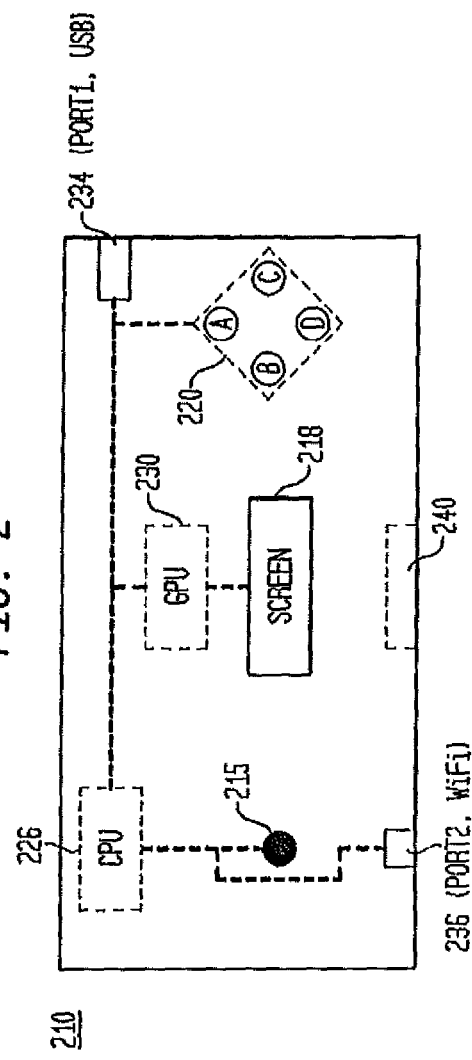
FIG. 2 illustrates a hand-held device that may be used in a system in accordance with an aspect of the present invention.

FIG. 2 illustrates a hand-held device 210 that may be used in the system shown in FIG. 1 in accordance with an aspect of the present invention. As shown, in the preferred embodiment the device 210 includes at least one joystick 215, a screen 218 and a set of control buttons 220. The device 210 typically also includes a central processing unit 226 and a graphics processing unit 230. In addition, the device 210 includes ports or interfaces 234, 236 for connecting to other devices, such as game console 16. In a preferred embodiment, these ports may comprise ports for universal serial bus (USB) or WiFi connections. The device 20 may also include additional ports that allow connection to a monitor or display. The device 210 may further include a receptacle or opening 240 for receiving game media such as a game card or disk (not shown). In general, the hand-held device 210 operates under the control of CPU 226, which processes game information for display on the screen 218 via graphics processor 230.

Figure 3:
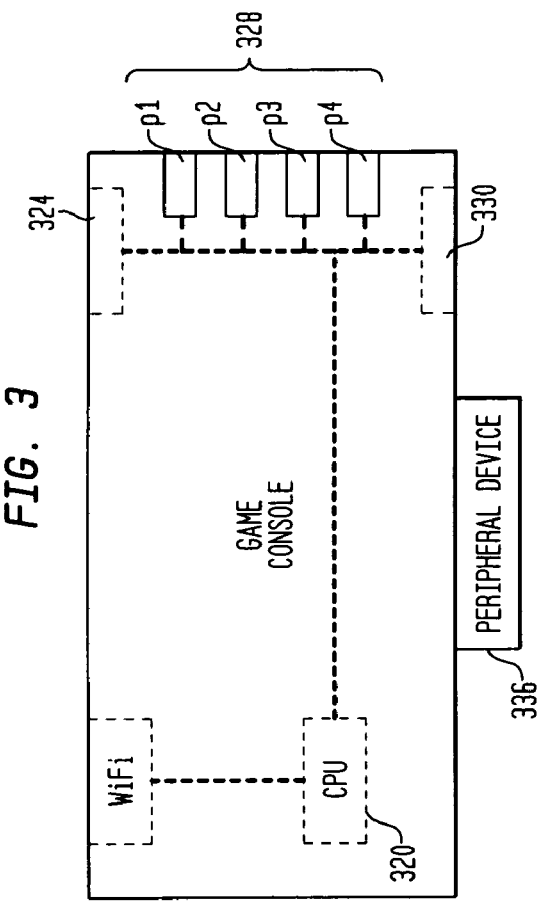
FIG. 3 illustrates a game console in accordance with an aspect of the present invention.

FIG. 3 illustrates a game console 316 in accordance with an aspect of the present invention. Game console 316 includes a central processing unit 320, which controls the operations of the game console. Typically, central processing unit 320 comprises a processor that is capable of handling the large computational workload required of a game console. The game console also includes a video processor 324 that interfaces with a monitor or display (not shown). Game console 316 further includes a plurality of ports or interfaces 328 for transmitting and receiving data to or from a game controller, such as game controller 20, hand-held game 10, 210 or other electronic devices. These ports include wired and wireless connections such as those provided using a USB or WiFi interface connection. The game console 316 also includes a receptacle 330 for receiving gaming media such as a card or disk. As is explained in further detail below, in a preferred embodiment the game console includes a peripheral device 336, which may be incorporated in or connected to the game console 316 via a cable or wirelessly.

Figure 4:
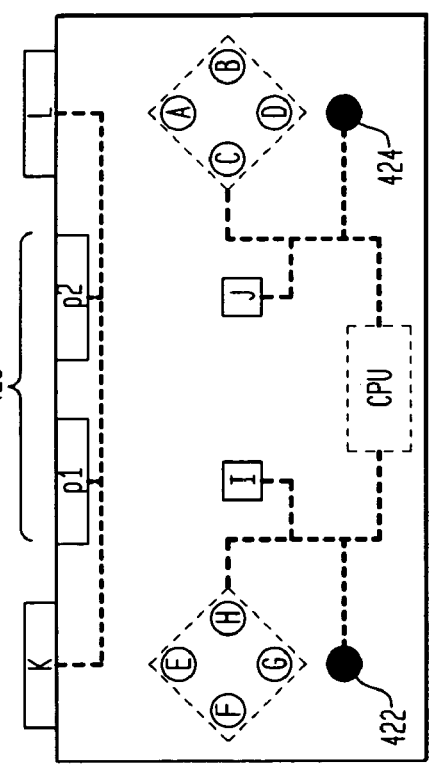
FIG. 4 illustrates a game controller in accordance with an aspect of the present invention.

Turning now to FIG. 4, there is illustrated a game controller 420 in accordance with an aspect of the present invention. In a preferred embodiment, the game controller 420 includes a pair of joysticks 422, 424, and various control buttons A through L. The controller also includes one or more ports 428, such as USB and/or other wireless transceivers, for transmitting and receiving control signals or other gaming information to and from a game console, such as 16 or 316, or a hand-held game device, such 10 or 210. In the preferred embodiment, the game controller includes the capability to respond to haptic type commands including commands that cause the controller to vibrate or rumble.

Referring to FIGS. 1 and 5, in another, aspect, the present invention includes a method for communicating messages containing gaming information from a hand-held device 10 to a game controller 20 through the game console 16 and/or communicating such information from the game controller 20 through the game console 16 to the hand-held device 10. More specifically, in the preferred embodiment, messages from the hand-held device comprise a command that includes haptic information.

In particular, in accordance with the method 500 shown in FIG. 5, the hand-held device 510 is preferably equipped with a game that causes haptic information to be generated. As the hand-held device 510 is advantageously designed to be small in size, it does not usually include the capability to respond to haptic information such as by vibrating or the like. Accordingly, in order to give a user the full effect of games that generate haptic commands, an aspect of the present invention provides this capability by using a game console, such as game console 316 or 520 to translate commands from the hand-held device into commands that are compatible with a game controller that has haptic function capability such as controller 540.

As indicated in FIG. 5, in this aspect of the invention, the hand-held device 510 generates a command 515 that is sent to the game console 520. As the command is not in a format suitable for direct transmittal to game controller 530, it undergoes translation at the game console 520. In the preferred embodiment, the game console 520 includes a protocol that translates the command information from a first format into a second format. Preferably, the protocol operates at the application layer of the 7-layer open system interconnect (OSI) model and employs a socket type connection. In addition, as discussed below, the protocol operates bi-directionally by also translating control information sent by the game controller 540 into a format that is suitable for the hand-held device.

After translation of the command information at step 517, the game console 520 transmits this information 519 to the game controller 540, which responds to the information. As discussed above, preferably, the command information includes haptic information which when received by game controller 540 causes the game controller 540 to rumble or vibrate.

As is also shown in FIG. 5, the game controller 540 transmits control information 522 destined for the hand-held device to the game console 520, where such information undergoes translation 526 into a format that is compatible with the hand held device 510. In addition to remedying format incompatibilities; as part of its translation, the protocol also resolves differences between the functionality of controller buttons on the hand-held game device 510 and the game controller 540. For example, in some instances, the hand-held device may include only one joystick whereas the game controller may include two joysticks. Thus, whereas the game console may receive control information from each joystick on the controller 540, the hand-held device is equipped to only handle information from a single joystick. In this instant, as part of its translation processing, the game console 520 preferably maps the information associated with both joysticks on the game controller into control information that would be generated by the single joystick on the hand-held device.

After translating the controller information (step 526), the game console 520 then transmits the translated control information 530 to the hand-held device 510. Typically, control information 522, 530 comprise information that controls the actions of the game being played using the hand held device 510. For example, this information may control the actions of avatars within a game, what the user sees on screen (e.g., panning a screen across objects in the game) and any other actions associated with playing video games.

In a further aspect of the present invention, the operating system used to manage the game applications (e.g., software) may be augmented to include the translation protocol described above. In this way, the game console may then act as a translation device for the hand-held device and allow a wider variety of games to be played using the hand-held device. In particular, games that require the functionality required by game controllers 20, 420 and 540 may then be played using the hand-held device. In addition, since game consoles are generally equipped with more powerful processors than hand-held devices, the game console's processor may be shared with the hand-held device. This would allow more processor hungry applications to run on the hand-held device, thereby lowering its processor design requirements. This may allow a different class of hand-held game devices, e.g., tamaguchis, access to more sophisticated or processor hungry applications.

In another aspect of the present invention, the game console may also function as a gateway between different hand-held game devices. For example, if the game console includes a WiFi or other connection, it may be used to link a local hand-held device, e.g., one proximate the game console, with a remote hand-held device that is connected using the WiFi connection. In this way, games that allow interactions among multiple users may be played through a game console although the users may be at different geographic locations, e.g., different states, countries, continents.

In a further aspect of the present invention, the hand-held game device 10, 210, 510 may control one or more peripheral devices integrated in or coupled to the game console 16, 316, 520. For example, if the game console is equipped with a camera, the hand-held device may pass command information to the game console to operate the camera causing it to take a photograph or shoot a video. As another example, the peripheral device may comprise a microphone. In this way, the hand-held game device may be used to perform games which require the user to use a microphone without requiring a microphone jack to be built into the hand-held device.

In accordance with a most preferred embodiment, the hand-held device, game console and game controller respectively comprise a SONY PLAYSTATION PORTABLE (PSP), PLAYSTATION game console and a dual shock controller. In this regard, a user may play a game on the PSP using a dual shock controller that is linked to the PSP through the PS3. In addition to the advantages discussed above, if equipped with a video output port, the PSP on screen information may be outputted to a display so that a user would be provided with a different playing experience than that provided using only the hand-held device.

Although the invention herein has been described with reference to particular embodiments, it is to, be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system, comprising:
   a game console;
   a game controller coupled to the game console through a first interface and configured to generate and process control information, the game controller being further configured to control a gaming application; and
   a local hand-held game device coupled to the game console through a second interface and configured to receive, through the game console, control information transmitted by the game controller, the control information including information that controls actions of the gaming application, the control information being generated by the game controller based on user input received at the game controller;
   wherein the local hand-held game device is configured to execute, at least in part, the gaming application; and
   wherein the local hand-held game device receives from the game controller, via the game console, user input for controlling the gaming application.

2. The system of claim 1, wherein the control information comprises command information causing the game console to initiate a predetermined action.

3. The system of claim 2, wherein the predetermined action includes capturing an image using a camera coupled to the game console.

4. The system of claim 3, wherein the game console transmits the captured image to the local hand-held game device through the second interface.

5. The system of claim 1, wherein the first and second interfaces comprise interfaces selected from the group consisting of USB, WiFi and Bluetooth connection interfaces.

6. The system of claim 1, wherein the game console includes a third interface for communicating with a remotely located hand-held game device.

7. The system of claim 6, further comprising communicating gaming information between the local and remote hand-held game devices through the game console.

8. The system of claim 7, wherein the third interface comprises a WiFi interface.

9. The system of claim 1, wherein the game console includes a data processor that processes gaming information for the hand-held device.

10. The system of claim 9, wherein the gaming information comprises rendering information associated with on-screen objects for the hand-held device and the rendering information causes a change in location of an object on a screen associated with the hand-held game device.

11. The system of claim 1 wherein the local hand-held game device further comprises a screen for outputting graphics produced by the gaming application when the gaming application is executed by a processor.

12. A system for communicating game information, comprising:
   a game console capable of processing haptic information;
   a game controller coupled to the game console through a first interface and capable of processing haptic information received from the game console, the game controller being operable to control a gaming application; and
   a hand-held game device coupled to the game console through a second interface, the hand-held game device being operable to transmit to the game controller, through the game console, haptic information that is generated by a gaming application executing on the hand-held game device.

13. The system of claim 12, wherein the hand-held game device communicates with the game console using an application layer protocol that translates haptic information generated by the hand-held device into control information compatible with the game controller.

14. The system of claim 12, wherein the haptic information comprises control information that communicates a sense of touch to a user.

15. The system of claim 14, wherein the haptic information comprises information associated with forces, vibration or motion.

16. The system of claim 12 wherein the hand-held game device further comprises a screen for outputting graphics produced by the gaming application when the gaming application is executed by a processor.

17. A method for communicating information in a gaming system, comprising:

generating a message including haptic control information at a hand held game device, the haptic control information being generated by a gaming application that is being executed by the hand-held gaming device;

transmitting the message from the hand-held gaming device to a game console; and transmitting, by the game console, the message to a game controller that is responsive to haptic control information.

18. The method of claim 17, further comprising translating, at the game console, the message from a first format generated by the hand held game device into a second format that is compatible with the game controller.

19. The method of claim 17 wherein the hand-held game device further comprises a screen for outputting graphics produced by the gaming application when the gaming application is executed by a processor.

* * * * *